United States Patent [19]

le Granse

[11] Patent Number: 4,708,263

[45] Date of Patent: Nov. 24, 1987

[54] OUTLET NIPPLE FOR DISPENSERS OF BEVERAGE CONCENTRATES

[75] Inventor: Josephus N. le Granse, Nieuwegein, Netherlands

[73] Assignee: Douwe Egberts Koninklijke Tabaksfabriek-Koffiebranderijen-Theehandel N.V., Utrecht, Netherlands

[21] Appl. No.: 933,921

[22] Filed: Nov. 24, 1986

Related U.S. Application Data

[63] Continuation of Ser. No. 793,466, Oct. 30, 1985, abandoned, which is a continuation of Ser. No. 522,217, Aug. 11, 1983, abandoned.

[30] Foreign Application Priority Data

Aug. 12, 1982 [NL] Netherlands ............... 8203177

[51] Int. Cl.⁴ .................. B67D 1/08; F16K 23/00
[52] U.S. Cl. ............................. 222/1; 222/148; 222/504; 222/571
[58] Field of Search ............... 222/1, 129.1–129.4, 222/148, 504, 566, 567, 571, 575, 641, 640; 239/590, 601; 99/295, 306

[56] References Cited

U.S. PATENT DOCUMENTS

| | | | |
|---|---|---|---|
| 2,809,073 | 10/1957 | Wahlert | 239/590 X |
| 2,981,483 | 4/1961 | Pichon | 239/580 X |
| 3,258,166 | 6/1966 | Kuckens | 222/504 X |
| 3,640,433 | 2/1972 | Rodth | 222/129.4 X |
| 3,823,408 | 7/1974 | Gordon, III | 239/601 X |
| 4,378,079 | 3/1983 | Kuckens | 222/504 X |
| 4,550,858 | 11/1985 | Noomen | 222/1 |

FOREIGN PATENT DOCUMENTS

2332228 6/1977 France.

Primary Examiner—H. Grant Skaggs
Assistant Examiner—Kevin P. Shaver
Attorney, Agent, or Firm—Cushman, Darby & Cushman

[57] ABSTRACT

Method and apparatus for dispensing beverage concentrates and preventing the concentrate from drying-up. In a beverage dispensing machine, an outlet nipple is provided having a first diameter bore portion and a second bore portion conically flared outward extending away from the first bore portion. The shape of the second bore retains a quantity of concentrate therein after dispensing which prevents ambient air from contacting concentrate in the smaller first bore portion and prevents the concentrate therein from drying-up.

1 Claim, 7 Drawing Figures

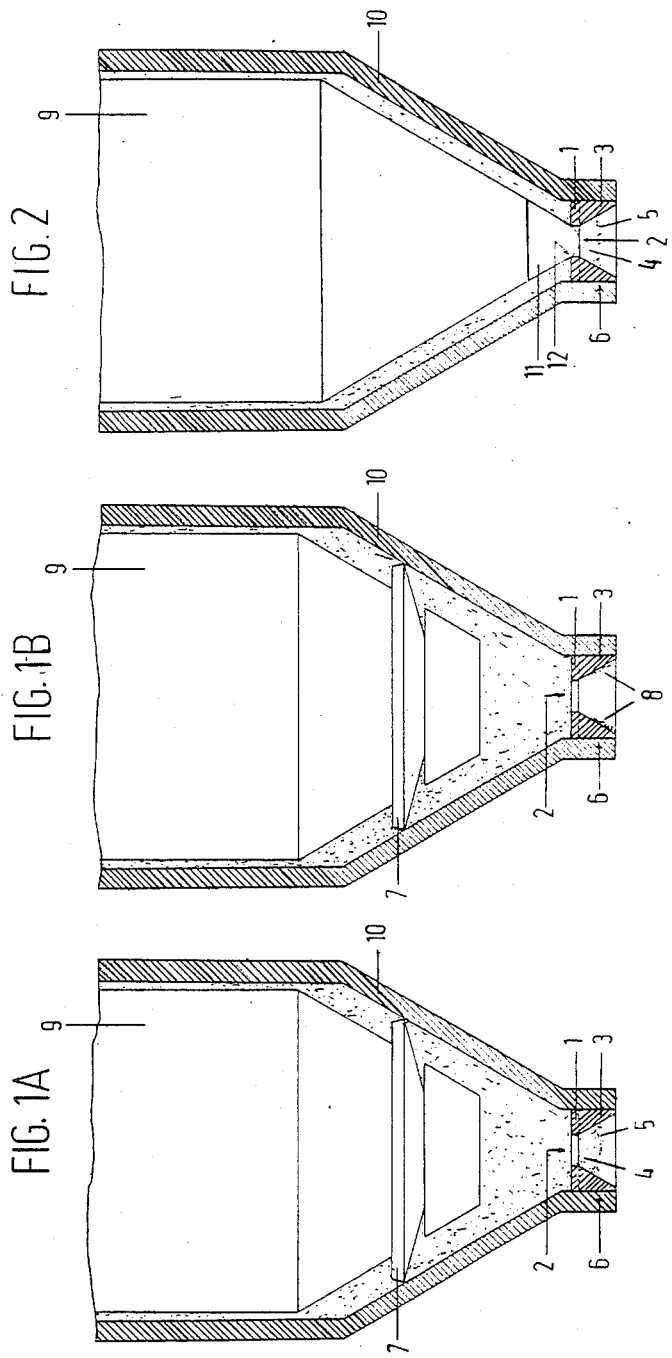

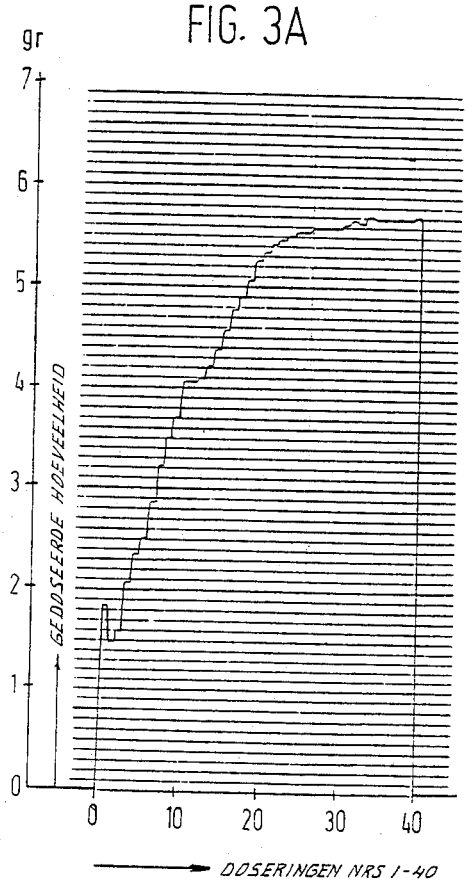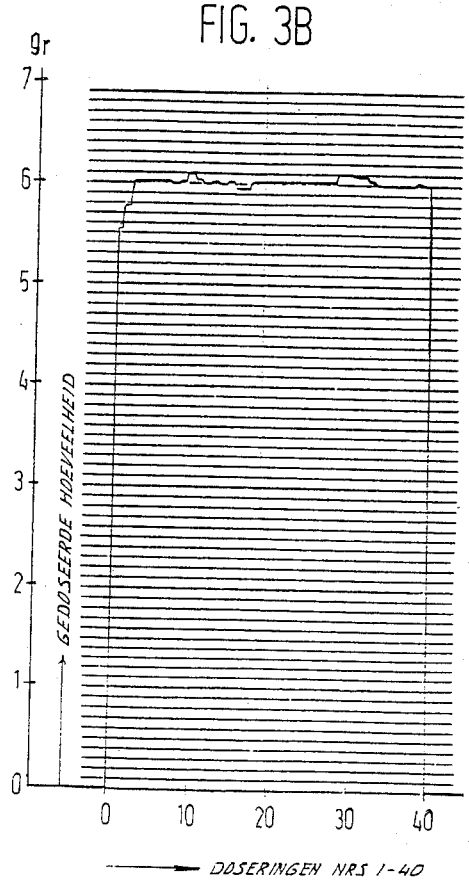

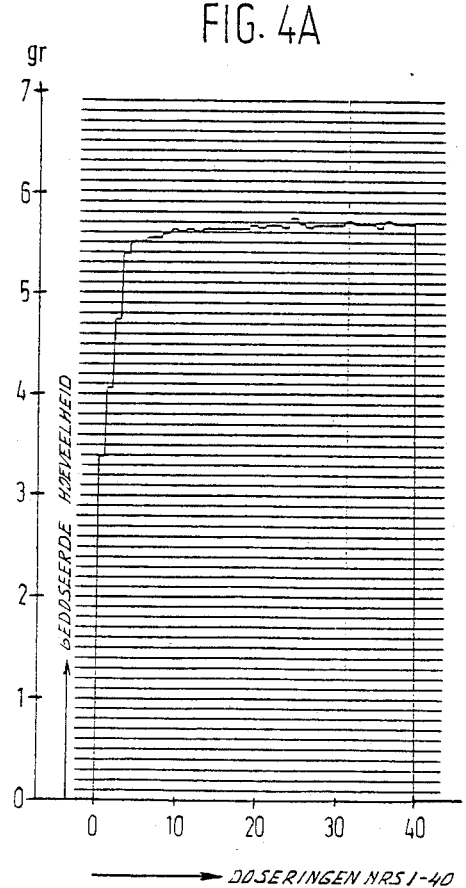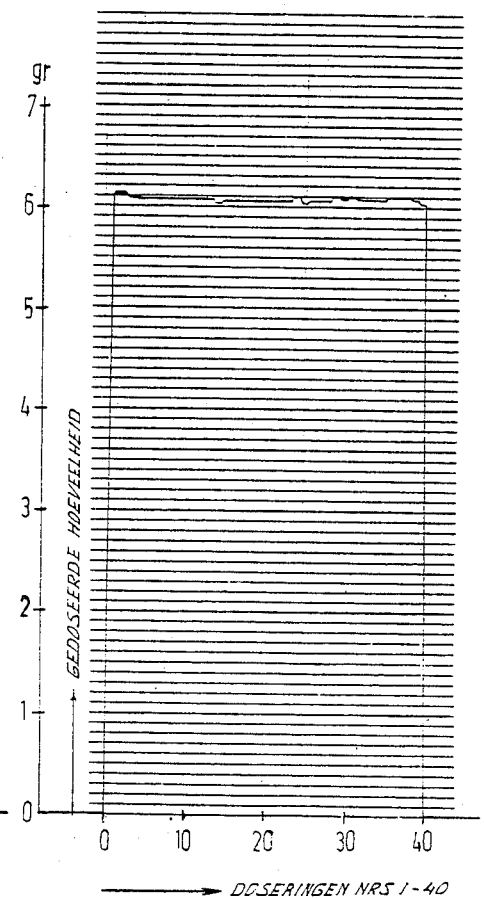

OUTLET NIPPLE FOR DISPENSERS OF BEVERAGE CONCENTRATES

This is a continuation of application Ser. No. 793,466, filed Oct. 30, 1985, now abandoned, which is a continuation of application Ser. No. 522,217, filed Aug. 11, 1983, now abandoned.

In the so-called timed metering of beverage concentrates in beverage dispensing machines, a valve is kept in its open position for a certain amount of time to permit a pre-determined quantity to issue under a given pressure. A frequently used form of valve comprises a housing provided at the bottom with an outlet nipple (bored nipple) and a valve member is slidingly supported against the inner wall of the housing, which member, left to the effect of gravity, blocks the flow of liquid from the outlet nipple. A metered quantity can be dispensed by lifting the valve member, which is normally done magnetically.

The pressure under which the liquid flows out can be kept constant by using the Mariotte-bottle principle (see U.S. Pat. No. 3,258,166). It is also possible, however, to adapt the outflow period to the outflow pressure (see British Pat. No. 2,077,228A).

It is clear that, under otherwise constant conditions, the bore of the outlet nipple determines the rate of concentrate outflow, that is to say, the metered quantity depends on the resistance which the beverage concentrates encounters on its way out. Accordingly, this resistance should be controllable.

Many beverage concentrates, however, when exposed to the air, exhibit drying-up effects which may give rise to incrustation when there is a relatively long period of time between two successive dispensations. This is the case, for example, in the construction described in U.S. Pat. No. 3,258,166. As a result of such incrustation, the outlet passage is narrowed adjacent its end. This in turn has for its result that when dispensing is resumed, the first quantities dispensed are considerably undersized. It is true that, in most cases, the incrustation is again fully dissolved and/or washed away, but before this condition is reached, various dispensations are required. Accordingly, these are below standard.

In the construction described in U.S. Pat. No. 3,258,166, sealing is accomplished by a silicone ring secured to the valve member to come to bear on the lower part of the housing, which tapers conically on the inside, at some distance above the outlet opening thereof. If a valve is selected in which the tip of the valve member falls into a seat surrounding the outlet opening, thereby obstructing the passage through the outlet opening to the concentrate, "adhesive effects" may occur. That is to say, owing to evaporation, a highly viscous solution may be formed between the seat and the tip of the valve member. In that case a relatively great force is required for magnetically lifting the valve member to open the valve, which would require a very great electromagnet, with all the disadvantages of that.

It is an object of the present invention to provide an outlet nipple for the devices in question, which is free from incrustation and adhesive effects.

The invention accordingly provides an outlet nipple for a dispenser of beverage concentrates that exhibit undesirable drying-up effects when exposed to the air, comprising a first bored portion whose bore diameter, under otherwise equal conditions, determines the outflow rate of the concentrate, characterized by a second portion of wider throughbore adjoining the lower end of said first portion, said second portion being of such construction that after each dispensation either an amount of concentrate remains appending therein to separate the concentrate present in the throughbore of the first portion of the outlet nipple from the outer air, or the cylindrical first portion is left fully free from liquid or at least substantially so.

The meaning of the term "construction" in the above context will become clear from a reading of the following description of the drawings. Under certain conditions the widened portion may be cylindrical, but in a preferred embodiment of the invention the second portion of the outlet nipple is internally conically widened towards the lower end thereof.

As will become clear from a reading of the description of the accompanying FIGS. 1A and 1B, in case after each dispensation an amount of concentrate remains appending in the widened portion, this amount will prevent drying-up effects from penetrating the portion of the outlet nipple which determines the resistance to liquid flow. It is also clear that in the case in which the cylindrical first portion of the outlet nipple is left fully free from liquid, or at least substantially so, after the dispensation, no interfering drying-up effects occur in this cylindrical first portion.

Some beverage concentrates exhibit the phenomenon—especially upon standing—that soft lumps are formed in them. Specifically this is the case with coffee extract concentrate. Upon standing for a short time after a quantity has been dispensed, these lumps accumulate in the bottom part of the dispenser housing so that when dispensing is resumed the first immediately succeeding quantities dispensed are undersized. We have now found that this effect can be counteracted by selecting the bore of the portion of the nipple which determines the rate of outflow as short as possible, which is also beneficial in preventing possible drying-up effects as referred to above. The lower limit is of course dictated by the strength of the material of which the nipple is made. Highly suitable materials are, for example, polycarbonate or polytetrafluoroethylene (PTFE). Other materials. are not excluded, however.

The invention will now be described, by way of example, with reference to the accompanying drawings, in which FIGS. 1A and 1B illustrates a nipple according to the invention in longitudinal sectional view and on an enlarged scale, suitable for use with a known per se type of valve. FIG. 1A illustrates the condition in which a droplet remains appending in the conical portion of the nipple. FIG. 1B illustrates the condition in which, after dispensing a certain quantity, the first cylindrical portion of the nipple becomes free from liquid, or substantially so.

FIG. 2 illustrates a nipple according to the invention in enlarged, longitudinal sectional view, suitable for a type of valve in which the tip of the valve member falls into a seat surrounding the outlet opening.

FIGS. 3A and 3B gives a comparison of 40 successive dosages for a coffee extract having a dry content of 22%, after the lapse of 65 hours between the last of a series of dispensations and the first of the 40 under consideration. The graph in FIG. 3A relates to a dispenser shown in FIG. 1 of U.S. Pat. No. 3,258,166 and the graph in FIG. 3B to a dispenser valve with an outlet nipple according to the present invention, but of otherwise the same construction.

FIGS. 4A and 4B gives a comparison of 40 successive dosages of a coffee extract containing 22% of dry matter, and in which substantial lumping occurred. The devices used were equal to those illustrated in FIGS. 3A and B. In both cases 40 immediately succeeding dosages were dispensed after a quiescent period of 10 minutes.

The figures will now be described in more detail.

In FIGS. 1A and 1B, 1 designates the portion of the outlet nipple whose bore 2 determines the rate of outflow of the beverage concentrate. Reference number 3 designates the internally conical part of the outlet nipple. Shown at 4, in FIG. 1A, is the "droplet" which, after a quantity has been dispensed, is retained in part 3. After prolonged standing, drying-up effects will occur at 5 at the surface of this droplet, whereby a thin skin may be formed. These drying-up effects will accordingly have no influence on the resistance to liquid flow in bore 2. When a next quantity is dispensed following the interval, the thin skin with a relatively large surface area will be broken, and the droplet washed away, without any difficulty. In FIG. 1B, opening 2 of the cylindrical portion is shown free from liquid. The conical portion of the nipple is for the greater part free from liquid as well, while at its rim, a small quantity of liquid, shown at 8, may be retained. Although the applicants do not want to tie themselves down to any explanation, it would appear that the situation as proven in practice may be the result of, under one hand, the interaction of, and adhesive forces of, liquid and nipple material, and on the other hand the effect of the sealing ring 7. This ring is more of less resilient. When, at the end of dispensing a metered quantity, the valve member 9 falls down under the influence of gravity, the droplet of liquid present in the nipple may, as it were, be "sucked up" when the valve member springs back. During this process the droplet "breaks", so that the cylindrical portion and the upper part of the conical portion of the nipple are left entirely free from liquid.

Accordingly, no liquid can dry up along the walls of the cylindrical portion. The apex angle of the conical portion 3 advantageously ranges from 40° to 100°, and preferably from 50° to 70°. In the case of coffee extract, a value of about 60° proved to be highly suitable. The height of bore 2 is preferably between 0.2 and 1 mm; a very suitable value is about 0.5 mm. The height of the conical portion 3 will normally range from 2 to 5 mm. The diameter of the bore of the cylindrical portion of the nipple preferably ranges from 1.5 to 4 mm, depending, among other factors, on the desired rate of outflow. The nipple is preferably formed as a replaceable unit which is a clamping fit in the bottom part 6 of the housing 10 of the dispenser. For different quantities to be dispensed and different beverage concentrates, a nipple can be replaced in a simple manner by another one with a different bore.

In the case of FIG. 2, it is not the incrustation of the outlet bore which is the problem, but the "adhesive" effect between the tip of the valve member and its seat. It is clear that this effect, which is also due to drying-up, does not occur with the nipple according to the invention when a droplet remains appending in the conical portion of the nipple, as shown at 5. In this case the nipple is provided with a seat 12, into which falls the tip 11 of a valve member. The parts not designated herein have the same reference numerals as in FIGS. 1A and 1B.

As expressed in the introduction above, the graphs of FIGS. 3A and 3B illustrate that, after a long interval, a substantial drying-up effect occurs with a conventional outlet nipple in the case of coffee extract. It is only after 25 portions have been dispensed that an approximately sufficient quantity of extract is dispensed. With the outlet nipple of FIGS. 1A and 1B, substantially no drying-up effect occurs under the same conditions. The first portions already provide a substantially correct quantity of extract.

The difference in the effect of lumps in the extract between a conventional outlet nipple and that illustrated in FIGS. 1A and 1B is apparent from a comparison of the graphs in FIGS. 4A and 4B.

When, after an interval of 10 minutes, 40 portions were dispensed in immediate succession, it turned out, in FIG. 4A, that the quantity dispensed was not up to standard until after 4 portions had been dispensed. In FIG. 4B the quantity dispensed was up to standard at once.

What I claim:

1. A method of dispensing coffee concentrate and preventing the drying-up effects of the coffee concentrate in a beverage dispensing machine comprising the steps of:

metering out by gravity flow a first quantity of said concentrate through an outlet nipple having a first cylindrically bore portion whose bore diameter determines the outflow rate of the concentrate and ranges from 1.5 to 4 mm, and a second portion with an upper end adjoining the lower end of said first portion and having the same bore diameter as said first portion, said second portion having a lower end with a bore diameter larger than the bore diameter of the first portion and joined with its upper end such that the second portion internally has the shape of a truncated cone with an apex angle of 40° to 100°, the height of said first bore portion being short relative to the height of the second portion, said second portion retaining a quantity of said concentrate therein such that said first portion is left substantially free from interfering drying up effects of ambient air following dispensing of concentrate from the outlet nipple and successively dispensing metered quantities of said concentrate through said outlet nipple, with each metered quantity being substantially the same.

* * * * *